E. M. WILKINS.
PROCESS AND APPARATUS FOR TESTING ELECTRIC METERS.
APPLICATION FILED MAR. 20, 1908. RENEWED MAR. 18, 1911.
1,005,758.
Patented Oct. 10, 1911.
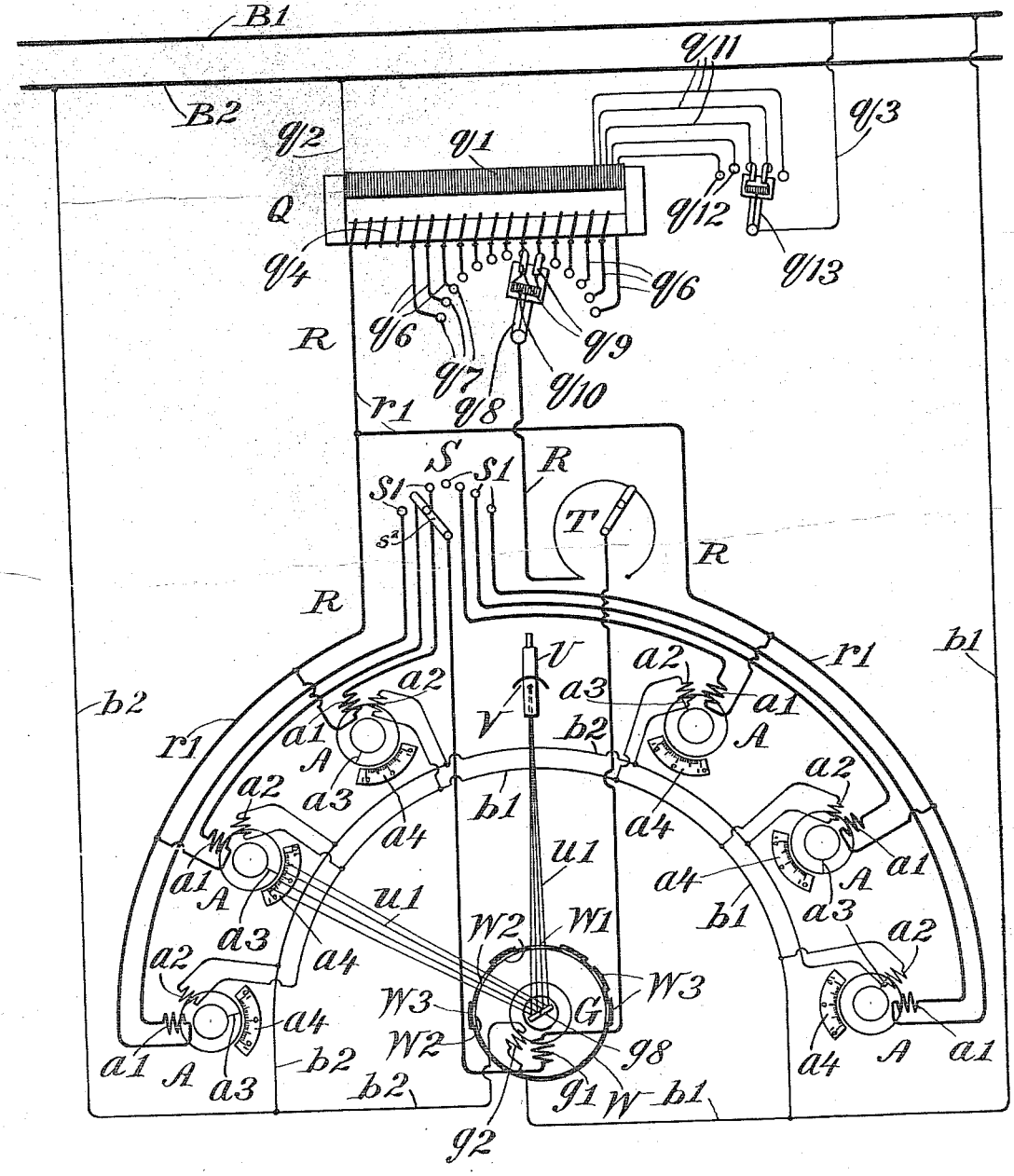
Witnesses:
Donn Twitchell
E. C. Thompson.
Inventor
Edgar M. Wilkins
By his Attorney
Edward P. Thompson

UNITED STATES PATENT OFFICE.

EDGAR M. WILKINS, OF MEXICO, MEXICO.

PROCESS AND APPARATUS FOR TESTING ELECTRIC METERS.

1,005,758.  Specification of Letters Patent.  Patented Oct. 10, 1911.

Original application filed August 12, 1907, Serial No. 388,474. Divided and this application filed March 20, 1908, Serial No. 422,277. Renewed March 18, 1911. Serial No. 615,386.

*To all whom it may concern:*

Be it known that I, EDGAR M. WILKINS, a citizen of the United States of America, and resident of Mexico city, Mexico, have invented certain new and useful Improvements in Processes and Apparatus for Testing Electric Meters, of which the following is a specification.

This application for a patent is a division of my former application, filed on or about August 12th, 1907, Serial Number 388,474, and entitled, process and apparatus for testing wattmeters Patent Number 905,966.

The invention herein set forth relates to a process and apparatus for standardizing wattmeters.

The objects of the invention are to secure a saving of time over processes now in use, and to secure such a degree of accuracy as is desirable in practice.

Without regard to the various scopes of invention, which are attended to in the claims, the statement of my invention is as follows: The process of comparing two rotary registering meters, one of which has a spot or mark upon a rotating part thereof, consists in placing a fixed spot or mark so as to be viewed adjacent to said rotating spot or mark, arranging a mirror upon a corresponding rotating element of the second meter, setting said meters in rotation under the same load, directing a beam of light upon said mirror from such position that its reflection therefrom will be cast momentarily upon said first meter at a definite point in the rotating of the second, and observing the reflection in said mirror of the successive angular positions of said rotating spot or mark when momentarily illuminated by said reflected beam.

The apparatus for carrying out the process for comparing rotary registering meters, comprises, in combination with two of such meters to be compared, a spot or mark on the rotary element of one of said meters, a fixed spot or mark in connection with which its position may be measured a mirror mounted on the corresponding element of said second meter, and means for throwing a beam of light upon said mirror whereby said spot is momentarily illuminated at a certain angular position of said mirror.

The principles of my invention are well and clearly illustrated in the accompanying drawing.

The single figure of the drawing shows diagrammatically the arrangement of the parts and electrical connections for standardizing simultaneously or successively, a number of alternating current service meters by means of a secondary standard, or standardized rotating-meter.

In the drawing every reference numeral and letter refers always to the same part.

The characters B' and B² designate the bus-bars or main conductors of an electric circuit carrying an alternating current.

The apparatus consists of a transformer Q having a high-tension primary $q'$, connected by leads $q^2$, $q^3$, to the respective mains B', B², and its secondary $q^4$, which is of few turns so as to give a large current at low tension, is divided by a plurality of taps $q^6$ into a number of segments to which correspond contact-bosses $q^7$, disposed in a circular manner about the pivot of the contact-lever $q^8$, which is so arranged as to connect any one of the bosses $q^7$ with one pole of the current-circuit R. The lever $q^8$ may be constructed with a pair of contact-fingers $q^9$ and inductance $q^{10}$. The primary $q'$ of the transformer is tapped at one end by a plurality of taps $q^{11}$ which are brought down to contact-bosses $q^{12}$ disposed for connection with a contact-lever $q^{13}$ connected to the lead $q^3$. In this way, the finer adjustment of the current-circuit is provided for.

The secondary standard G is shown, as disposed centrally of a group of service-meters A which are to be tested or standardized. One of the terminals of the current-coil of each of the meters A may be permanently connected to one end of the secondary winding of the transformer Q by means of the circuit leads $r'$, as shown; the other ends of said current-coils being brought to the respective contact-bosses $s'$ of a multipolar-switch S, each boss thereof corresponding to the current-coil terminal of one of the meters A. The circuit R passes from the contact-lever $q^3$ through a continuously variable rheostat T, thence through the current-coils $g'$ of the standard meter G, and thence to the contact-lever $s^2$ of the switch S; whereby the current in the circuit R passes successively through the rheostat T, the current-coil $g'$ of the standard G, and the current coils $a'$ of one of the service-meters A. Before making the test, the potential coils $a^2$, $g^2$ of all the meters are preferably connected up with the line by means of the leads $b'$, $b^2$, so as to warm up the meters and have them in normal condition when the test is made. Each of the service meters A is provided with a spot or mark $a^3$ upon the disk thereof, and a stationary scale $a^4$ placed adjacent thereto as shown in the drawing, this scale being preferably graduated in hundredths of a circumference each way from a central zero-point as shown. At a convenient distance from the standard G is placed a telescope U or a focusing lamp V, or both, these being directed toward a small mirror $g^8$ placed on the shaft of the meter G. Both the telescope U and the lamp V are focused upon the scale $a^4$ of any one of the service-meters A, as indicated by the ray-lines $u'$, it being understood, of course, that a second mirror may be used when necessary to throw the light down in a vertical direction, as where the scale $a^4$ is horizontal, being necessarily so represented in the diagram. It is also desirable to have a cylindrical screen or diaphragm W inclosing the meter G and having openings W' and W² therein in position to permit the passage of the light-rays between the mirror $g^8$ and the telescope U, lamp V, and scale-disks $a^4$ of the meters A. All but one of these openings W² may, to avoid confusion, be closed by diaphragms W³ while the meter corresponding to the opening which is left open is being calibrated.

While the telescope and focusing-lamp are used conjointly, the light from the latter will be thrown instantaneously upon the scale of the meter being tested, when the mirror $g^8$ is in the proper angular position to reflect the light from the lamp upon the meter scale. The light so flashed upon the scale will disclose the momentary position of the spot $a^3$ on the meter-disk, which is observed through the telescope U, and the reflection being momentary, the spot will appear to be standing still at the given point on the scale. On the second revolution of the meter G the same thing will take place, and if the meter under test is correct, the spot $a^3$ will appear at the same point as before, and so on for successive revolution, whereas, if fast or slow, it will appear to move slowly off to the right or left as observed through the telescope. In this case the rate of acceleration or retardation may be measured, if desired, and the meter set to the right speed by adjusting the control-magnets. As soon as one meter has been tested, the switch-lever $s^2$ is shifted to start up the next meter which is tested in turn, and thus a large number of meters may be successively tested quickly, and without any change of adjustment of the testing apparatus other than above indicated.

In general, a meter can be tested with sufficient accuracy according to this process by a single revolution of the shaft, another revolution having been first allowed the meter to rise from zero to normal velocity. Although more than one spot might be used on the meter-disk for the purpose of testing in less than one revolution, I do not deem this advisable, as the rate of rotation may be slightly different from different parts of the revolution, making the first half, for example, appear longer or shorter than the second half. Where the telescope U alone is used (without the focusing-lamp) the meter-scales will be continuously illuminated, and where the focusing-lamp V is used alone, the position of the spot $a^3$ may be observed directly upon the scale, being kept in substantial darkness, except for the momentary illumination from the lamp V. In place of using the telescope U, the eye may be placed directly at this point, above or below the lamp V, and the mirror $g^8$ if slightly concaved will present to the eye directed at the mirror a magnified image of the scale of shorter duration.

In the above manner, the meter A may be adjusted to correct registration at any given load, and the variations from correctness may then be tabulated by testing under any other load. Even where the load-characteristics of the service-meters are the same as the standard by which they are tested, (which will be the case if they are of the same type and capacity) it is generally advisable to test them at two loads one heavy and one light, as casual defects, such as undue friction of bearings, gear-train, etc., can not otherwise be detected.

While some of the features herein described are limited to the uses of alternating current, it will be understood that in general, the system is applicable to any kind of current, and polyphase connections, for example, can readily be devised by those skilled in the art. I do not consider my invention limited in its form a scope of modification otherwise than may be inferred from the reasonable construction of my claims.

I claim as my invention:—

1. The process of comparing two rotary registering meters one of which has a spot or mark upon a rotating part thereof, and placing a fixed spot or mark adjacent to the path of said rotating spot or mark, whereby the angular position of the latter may be observed, a mirror upon the corresponding rotating element of the second meter or upon a part rotating in the same period, setting both meters in operation under the same load, and observing in said mirror the momentary reflection of the successive positions of said rotating spot or mark relative to said fixed spot or mark, whereby conclusions may be derived as to the relative rates of rotation of said meters.

2. The process of comparing rotary registering meters one of which has a spot or mark on a rotating element thereof, and a fixed spot or mark so as to be viewed adjacent to said rotating spot or mark, a mirror upon a corresponding rotating element of the second meter, said process consisting in setting said meters in rotation under the same load, directing a beam of light upon said mirror from such position that its reflection therefrom will be cast momentarily upon said first meter at a definite point in the rotating of the second, and observing the reflection in said mirror of the successive angular positions of said rotating spot or mark when momentarily illuminated by said reflected beam.

3. An apparatus for comparing rotary registering meters comprising, in combination with two of said meters to be compared, a spot on a rotating element of one of said meters, a fixed spot or mark in connection with which its position may be measured, a mirror mounted on the corresponding element of said second meter, and means for throwing a beam of light upon said mirror whereby said spot is momentarily illuminated at a certain angular position of said mirror.

4. An apparatus for comparing rotary registering meters comprising, in combination with two of said meters to be compared, a spot on a rotating element of one of said meters, a fixed spot or mark in connection with which its position may be measured, a mirror mounted on the corresponding element of said second meter, and means for observing the reflection in said mirror upon a fixed point at a distance therefrom of the momentary position of said spot or mark at the moment of each revolution of the second meter when said mirror is in proper position to reflect it.

5. An apparatus for comparing rotary registering meters comprising, in combination with two of such meters to be compared, a spot or mark on the rotary element of one of said meters, means for measuring its angular position from a fixed point, a mirror mounted on the corresponding rotary element of the other meter, means for placing the same load on both meters, a device for throwing a beam of light against said mirror in such direction that it is reflected momentarily upon said spot or mark in a certain angular position of said mirror, and a sighting device such as a telescope, arranged in line with said illuminating device to receive the reflection in said mirror of said spot at the same moment as illuminated by said illuminating device.

EDGAR M. WILKINS.

Witnesses:
A. ALLARD,
R. J. RAINE.